Sept. 11, 1928.
W. G. HAYNE
1,683,889
FOOD CONTAINER AND HEATER
Filed June 13, 1927
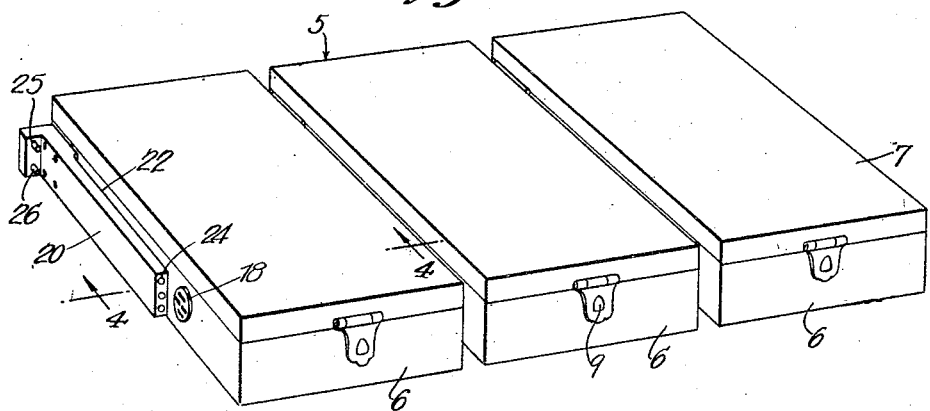
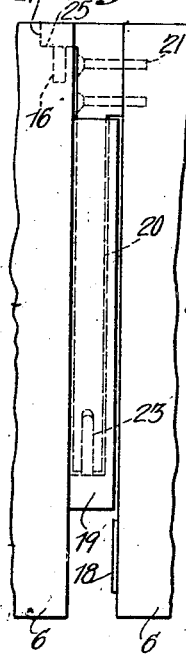
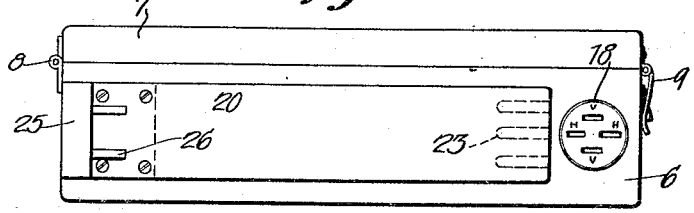
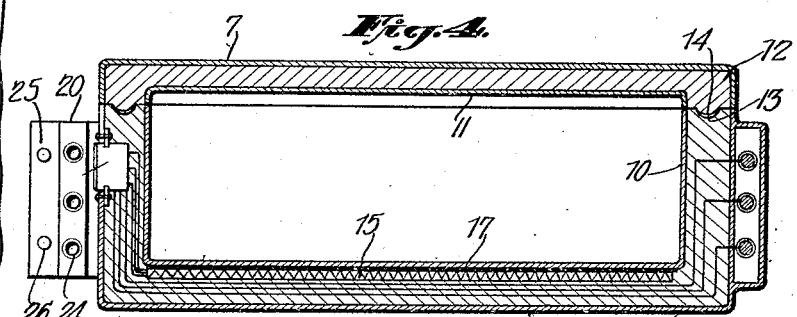
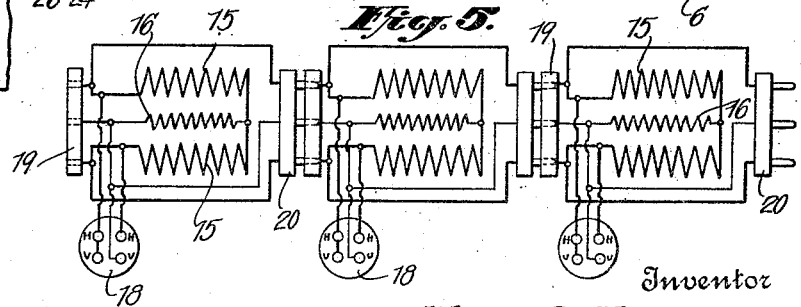
Inventor
WILLIAM G. HAYNE.
By His Attorney Patented Sept. 11, 1928.

1,683,889

UNITED STATES PATENT OFFICE.

WILLIAM G. HAYNE, OF BROOKLYN, NEW YORK.

FOOD CONTAINER AND HEATER.

Application filed June 13, 1927. Serial No. 198,537.

This invention relates to receptacles and in particular to those arranged for the transportation of foods.

Due to present domestic conditions, the cooking of foods at a central point to serve some of the members of a community has become popular and the problem of cooking meals and transporting them in their heated state, has been one which has been difficult of solution, and a particular object of my invention, therefore, is to provide a plurality of receptacles or containers in which the cooked meals can be transported and in combination with which means are provided for retaining the food at its cooked temperature during transportation and after delivery to the place where it is to be served and eaten.

A particular object of my invention is to provide a plurality of receptacles which can be connected together electrically and mechanically and each of which are provided with heating coils and a heat insulation whereby the contents thereof may be kept warm or heated, as is desired.

A still further object of the invention is to provide a plurality of receptacles which can be detachably secured together so that all of them are in electrical circuit or so that any one of them individually may be heated.

A still further object of the invention is to provide a plurality of receptacles which are all connected together electrically and mechanically but any one of which may be removed or replaced with a minimum of time and labor.

A still further object of the invention is to so arrange the receptacles that the electrical current used in a delivery vehicle may be used to retain the food hot during transportation, the receptacle also being provided with means whereby when they are detached from the heating circuit of the motor truck, they may be connected with the electric light circuit of a dwelling, thus retaining the food hot at all times ready for consumption.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in perspective of a plurality of receptacles as they would appear during transportation in a delivery vehicle, for instance, the connections thereof being shown at one end, of what might be termed a unit, consisting of three separate receptacles joined electrically and mechanically so that current may be passed through all three simultaneously to keep the contents thereof warm.

Figure 2 is an enlarged, fragmentary plan view showing how the receptacles are secured together so that a current of electricity may be passed therethrough, and so that they form one rigid unit.

Figure 3 is a side edge view in elevation of one of the receptacles showing the means whereby they may be attached to an adjacent receptacle and also illustrating the electrical plug whereby ordinary house or delivery vehicle current may be used to retain the contents of the receptacle at the desired temperature.

Figure 4 is a sectional view taken on the line 4—4 of Figure 1 showing the arrangement of the interior of the receptacle and showing how the wires are imbedded in the heat insulating filler, and Figure 5 is a schematic view of the wiring of a battery of three receptacles showing how they may be individually or collectively connected to a source of electrical current.

Referring to the drawings in detail 5, indicates a plurality of receptacles, each of which consists of an outer box member 6 which is provided with a suitable cover 7, the same being hinged thereto as at 8 and being releasably held in closed position through the medium of a snap latch 9, the receptacle 6 is provided with a spaced, porcelain, inner receptacle or lining 10 as is the cover 7, the latter being designated by the numeral 11 and being arranged to fit closely about the top of the inner receptacle to effectively seal the same. The space between the inner receptacle and the outer wall and cover of the receptacle 6 is filled with any suitable heat insulating material 12 such as asbestos or any other heat retaining compound. In order to more effectively seal the inner chamber, a suitable groove 13 is provided in the top edge of the heat insulating material 12 that is disposed in the box proper which is adapted to receive the extended ridge 14 formed on the lower edge of the heat insulating material that is used between the cover and the inner cover lining 11. Between the bottom 6 and the inner porcelain container 10 of the receptacles, I place a plurality of resistance coils 15 arranged substantially as shown in Figure 5 and which are adapted to carry the average voltage used in dwellings for light and heat and disposed between the resistance winding 15. I provide an auxiliary or compensating coil 16 for use on lower voltages, such for instance, as are used on motor vehicles. Between the coils 15 and 16 and the inner porcelain lining 10, I provide a sheet of dielectric material 17 and it is quite evident that the use of the coils is to maintain the inner receptacle 10 hot so that food therein may be kept at a proper temperature, not only during transportation but in the establishment where the containers are filled and in the dwellings or other places where the meals are to be served and eaten.

In order to provide for the different conditions under which the receptacles are to be used, I connect the resistance coil 15 not only with a suitable source plug 18 but a connection from each of the coils is made at one end of each receptacle to a socket bar 19 and at the opposite end to a plug member 20 and, as shown in Figures 2 and 3, the socket member 19 while shown diagrammatically in Figure 5 consists of an elongated extension 20 which is suitably secured as by the screws 21 in proper position at one side of the receptacle, the inner portion thereof being spaced as at 22 from the wall of the receptacle and being arranged so that it will fit into the plug piece 20, the plug piece being also in the nature of an elongated receptacle provided with plugs 23 in the bottom thereof, which are arranged to engage the plug opening 24 in the bottom of the extension 20, the upper end of the extension being offset as at 25 and is provided with the dowel pins 26. The extension 25, itself, is arranged to fit into a suitable cut-out 27 in the adjacent receptacle 6.

It is of course quite evident that when the receptacles are locked together by reason of the dowel pins 26 and also by reason of their electrical connections at 23 and 24, any number of these receptacles can be transported as a unit in a vehicle, may be detached one from another to deliver means contained therein and kept warm through the use of the electrical heating coils therein.

The plugs 23 are of course connected electrically to the coils 15 and 16 and when a plurality of the receptacles are joined, the current may pass through the main coil 15 or one of the main coils and the auxiliary coil 16. This is evident by inspection of Figure 5 wherein the wiring diagram shows the schematic arrangement of the circuit as used for instance, in connection with the house current or the vehicle current, and the main current plugs 18, above referred to, are designated by the letters "H" and "V" which denote house or vehicle plug in, so that when the receptacles are being transported, one of the sockets 18, for instance, can be connected up to the vehicle current outlet and the current will flow through one of the main resistance coils 15 and through the auxiliary coil 16 in each of the receptacles and when one of the receptacles is taken off, and brought into a dwelling, the house current source can be plugged into the plug 18 and the main resistance coil 15 will then receive the current, and will continue to keep the meal at the proper temperature, it being of course understood that the coil 16 is an auxiliary coil and takes a lower voltage than the main coil 15, this being necessary due to the voltage obtainable during transportation.

It is evident, therefore, that I have provided a plurality of receptacles which may be used in combination to retain cooked foods at a desired temperature during transportation and at the place where the food contained therein is to be eaten without the necessity of removing the food from the receptacles to re-heat it before it is to be served.

It is also evident that I have provided a plurality of receptacles which, while they may be used in combination, can be used individually and which may be separated at the point where each is to be delivered without affecting the heating of the other remaining receptacles.

It is also evident that I have provided a simplified construction through the medium of which the receptacles can be securely joined together yet may be readily detached one from another and when brought into a dwelling where food is to be served directly therefrom, may be immediately connected up to the house current to retain the food at the desired temperature.

While I have illustrated and described my invention with some degree of particularity, I realize than in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. A receptacle comprising a food container and electric heating coils adjacent thereto, one of the coils being of lower resistance than the other, a plug socket, a connection from the socket to the low resistance coil and to one of the higher resistance coils, and connection between the socket and high resistance coils whereby the coils can be selectively placed in circuit with an outside source of current to maintain the temperature used in the receptacle.

2. A plurality of containers adapted to be used in the delivery of food, each comprising an outer member, an inner member and an electric heating element between said members, and plug and socket connections between each of the containers whereby their heating elements can be connected in circuit.

3. A plurality of containers adapted to be used in the delivery of food, each comprising an outer member, an inner member, an electric heating element between said members and a dielectric material positioned between the heating element and said inner member, and a plug and socket connection between each of the containers whereby their heating elements can be connected in circuit.

4. A plurality of detachable containers, each comprising an extended arm portion and an extended pocket portion, the arm portion of one of the containers being arranged to fit into the pocket portion of the adjacent container whereby they are detachably held together.

5. A plurality of containers adapted to be used in the delivery of food, each comprising an outer member, an inner member and a plurality of electric heating elements of different resistances disposed between said members and plug and socket connections between each of the containers whereby their heating elements can be connected in circuit.

6. A plurality of containers adapted to be used in the delivery of food, each comprising an outer member, an inner member, electric heating elements of different resistances disposed between said members and dielectric material positioned between the heating elements and said inner members and a plug and socket connection between each of the containers whereby their heating elements can be connected in circuit.

In testimony whereof I affix my signature.

WILLIAM G. HAYNE. [L. S.]